US010183702B2

(12) United States Patent
Jaworski et al.

(10) Patent No.: US 10,183,702 B2
(45) Date of Patent: Jan. 22, 2019

(54) SIDEWALL ASSEMBLY FOR TRAILERS

(71) Applicant: Hyundai Translead, San Diego, CA (US)

(72) Inventors: Leszek Jaworski, San Diego, CA (US); Alvaro Frausto, San Diego, CA (US); Humberto Benitez, San Diego, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 0 days.

(21) Appl. No.: 15/351,227

(22) Filed: Nov. 14, 2016

(65) Prior Publication Data

US 2018/0015956 A1   Jan. 18, 2018

Related U.S. Application Data

(60) Provisional application No. 62/363,478, filed on Jul. 18, 2016.

(51) Int. Cl.
| | | |
|---|---|---|
| *B62D 25/02* | (2006.01) | |
| *B62D 29/04* | (2006.01) | |
| *B62D 33/04* | (2006.01) | |
| *B62D 29/00* | (2006.01) | |

(52) U.S. Cl.
CPC .......... *B62D 25/02* (2013.01); *B62D 29/005* (2013.01); *B62D 29/045* (2013.01); *B62D 33/046* (2013.01); *B60Y 2200/148* (2013.01); *B60Y 2410/124* (2013.01)

(58) Field of Classification Search
CPC ...... B62D 25/02; B62D 29/045; B62D 33/02; B62D 33/0222; B62D 33/023; B62D 33/04; B62D 33/045; B62D 33/048; B62D 53/06; B60Y 2200/148
USPC ...................................................... 296/186.1
See application file for complete search history.

(56) References Cited

U.S. PATENT DOCUMENTS

| | | | | |
|---|---|---|---|---|
| 3,393,920 | A  * | 7/1968 | Ehrlich ................ | B62D 33/048 280/423.1 |
| 6,010,020 | A  * | 1/2000 | Abal ..................... | B62D 33/04 220/1.5 |
| 6,220,651 | B1 * | 4/2001 | Ehrlich ................ | B62D 29/045 296/186.1 |
| 7,500,713 | B2 * | 3/2009 | Riley ................... | B62D 33/046 296/186.1 |
| 2005/0241253 | A1 * | 11/2005 | Song .................... | B62D 33/046 52/578 |
| 2006/0061136 | A1 * | 3/2006 | Pines .................... | B62D 33/04 296/186.1 |
| 2008/0116718 | A1 * | 5/2008 | Lewallen .............. | B60P 7/0815 296/186.1 |
| 2008/0197671 | A1 * | 8/2008 | Yurgevich ............ | B62D 33/046 296/186.1 |

(Continued)

*Primary Examiner* — Gregory A Blankenship
(74) *Attorney, Agent, or Firm* — Procopio, Cory, Hargreaves & Savitch LLP

(57) ABSTRACT

A sidewall assembly for a trailer including: a plurality of composite sandwich panels; and at least one composite side post coupled to the plurality of composite sandwich panels, each of the at least one composite side post including an outer post and an inner logistics post coupled to the outer post, wherein the outer post is formed with flexible metallic material and the inner logistics post is formed with hard metallic material.

16 Claims, 9 Drawing Sheets

(56) References Cited

U.S. PATENT DOCUMENTS

| | | | |
|---|---|---|---|
| 2009/0026215 A1* | 1/2009 | Roush | B60P 7/0815 220/652 |
| 2010/0007173 A1* | 1/2010 | Harrison | B62D 33/0207 296/186.1 |
| 2010/0078964 A1* | 4/2010 | Wylezinski | B62D 33/046 296/186.1 |
| 2011/0204678 A1* | 8/2011 | Katz | B62D 33/046 296/186.1 |
| 2016/0039476 A1* | 2/2016 | Kunkel | B62D 33/046 296/186.1 |

* cited by examiner

SIDEWALL ASSEMBLY FOR TRAILERS

CROSS-REFERENCE TO RELATED APPLICATIONS

This application claims the benefit of priority under 35 U.S.C. § 119(e) of U.S. Provisional Patent Application No. 62/363,478, filed Jul. 18, 2016, entitled "Bonded Logistics Post Sidewall." The disclosure of the above-referenced application is incorporated herein by reference.

BACKGROUND

Field of the Invention

The present invention relates to truck trailers, and more specifically, to a sidewall assembly for the truck trailer.

Background

A sidewall assembly of a trailer can be formed using a sheet and post design, which may use a plurality of side posts to which inner and outer sheets are attached.

SUMMARY

The present disclosure describes a sidewall assembly for a trailer.

In one embodiment, a sidewall assembly for a trailer is disclosed. The sidewall assembly includes a plurality of composite sandwich panels; and at least one composite side post coupled to the plurality of composite sandwich panels, each of the at least one composite side post including an outer post and an inner logistics post coupled to the outer post, wherein the outer post is formed with flexible metallic material and the inner logistics post is formed with hard metallic material.

In another embodiment, a wall assembly for a trailer is disclosed. The wall assembly includes: a side post including an outer post formed with aluminum and an inner logistics post formed with steel, the side post having first and second sides; a first composite sandwich panel coupled to the first side of the side post, the first composite sandwich panel including a first plastic core and a first pair of metallic outer layers coupled to the first plastic core; and a second composite sandwich panel coupled to the second side of the side post, the second composite sandwich panel including a second plastic core and a second pair of metallic outer layers coupled to the second plastic core.

In yet another embodiment, a sidewall assembly for a trailer is disclosed. The sidewall assembly includes: first and second composite sandwich panels; an outer post formed with flexible metallic material and coupled to the first and second composite sandwich panels; and an inner logistics post formed with hard metallic material and coupled at least to the outer post.

Other features and advantages of the present disclosure should be apparent from the present description which illustrates, by way of example, aspects of the invention.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

Improvements to the above-described sidewall assembly are described below. In one embodiment of the present disclosure, a sidewall assembly of a trailer can be formed using an outer post, composite sandwich panels, and an inner logistics post. Thus, in this embodiment, the sidewall can be assembled by bonding the outer post to the composite sandwich panels and the internal logistics post.

Figure 1A:
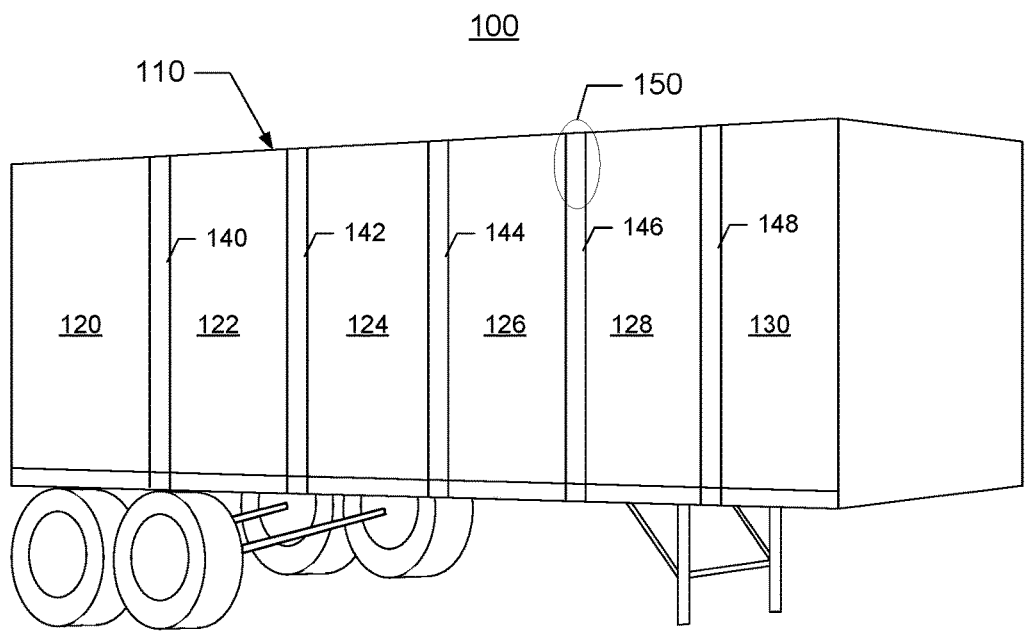
FIG. 1A is a side perspective view of a truck trailer in accordance with one embodiment of the present disclosure.

FIG. 1A is a side perspective view of a truck trailer 100 in accordance with one embodiment of the present disclosure. The illustrated embodiment of FIG. 1A shows a sidewall assembly 110 including a plurality of composite sandwich panels 120, 122, 124, 126, 128, 130 coupled to a plurality of sidewall posts 140, 142, 144, 146, 148. Although the sidewall assembly 110 of FIG. 1A is shown with a preset number of composite sandwich panels and another preset number of sidewall posts, any number of composite sandwich panels and sidewall posts can be used for form the sidewall assembly.

Figure 1B:
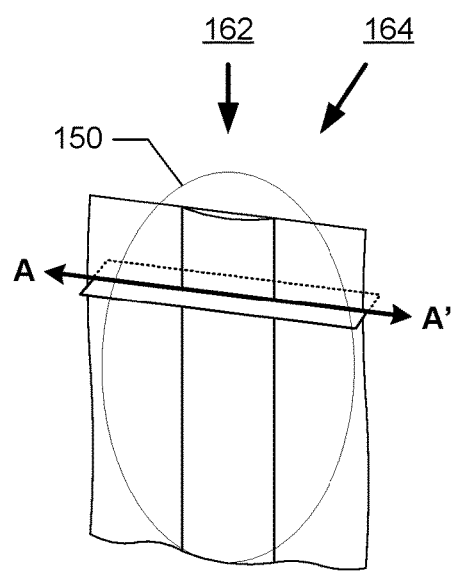
FIG. 1B shows the details of the coupling between the composite sandwich panels and a side post.

FIG. 1B and subsequent figures described below show the details of the coupling 150 between the composite sandwich panels and side posts.

Figure 2A:
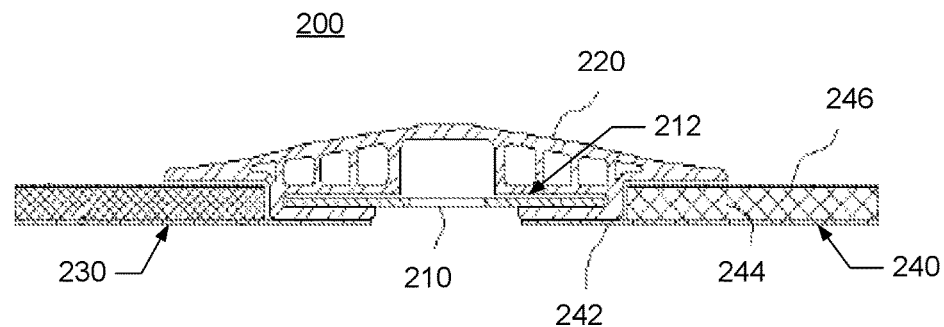
FIG. 2A is a cross-sectional top view of the coupling between the composite sandwich panels and a side post in accordance with one embodiment of the present disclosure.

FIG. 2A is a cross-sectional top view of the coupling 200 between the composite sandwich panels and a side post in accordance with one embodiment of the present disclosure. The coupling 200 is one embodiment of the coupling 150 shown in FIG. 1B. The cross section is made by slicing the coupling 150 along the line A-A' and looking down in direction 162 shown in FIG. 1B.

In the illustrated embodiment of FIG. 2A, the coupling 200 includes an inner logistics post 210, an outer post 220, and a plurality of composite sandwich panels 230, 240. The inner logistics post 210 is inserted into a pocket 212 of the outer post 220 and bonded to the outer post 220 with attachments means, which can be any combination of adhesives, mechanical fasteners, and other attachment means and methods including welding.

In one embodiment, the outer post 220 is formed with flexible metallic material such as aluminum, while the inner logistic post 210 is formed hard metallic material such as steel to provide it with strength. Thus, the side post (including the outer post 220 and the inner logistics post 210) is formed as an aluminum/steel composite post, which is then bonded to the composite sandwich panels 230, 240.

In one embodiment, each of the plurality of composite sandwich panels 230, 240 is formed with a core 244 and outer layers 242, 246 attached to the sides of the core 244. In one embodiment, the core 244 is formed with plastic material, while the outer layers 242, 246 are formed with metallic material such as steel.

Figure 2B:
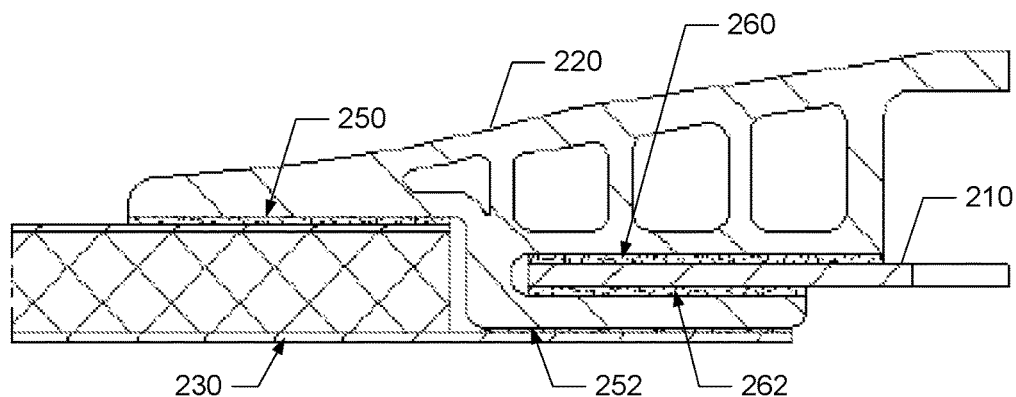
FIG. 2B shows the bonding of the composite post to the composite sandwich panel by applying the adhesive to the inner surfaces of the outer post to bond the composite post to the composite sandwich panel.

FIG. 2B shows the bonding of the composite side post 210, 220 to the composite sandwich panel 230 by applying the adhesive to the inner surfaces 250, 252 of the outer post 220 to bond the composite post to the composite sandwich panel 230. FIG. 2B also shows the bonding of the inner logistics post 210 to the outer post 220 by applying the adhesive to surfaces 260, 262 of the pocket 212 of the outer post 220 and to the inner logistics post 210.

Figure 3:
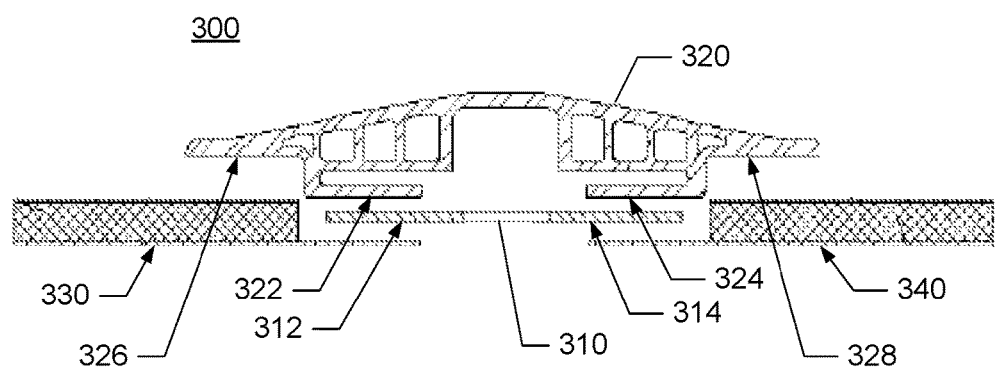
FIG. 3 is a cross-sectional top view of the coupling between the composite sandwich panels and a side post in accordance with another embodiment of the present disclosure.

FIG. 3 is a cross-sectional top view of the coupling 300 between the composite sandwich panels and a side post in accordance with another embodiment of the present disclosure. The coupling 300 is one embodiment of the coupling 150 shown in FIG. 1B. The cross section is made by slicing the coupling 150 along the line A-A' and looking down in the direction 162 of FIG. 1B.

In the illustrated embodiment of FIG. 3, the coupling 300 includes an inner logistics post 310, an outer post 320, and a plurality of composite sandwich panels 330, 340. The inner logistics post 310 is bonded to the inner surfaces 322, 324 of the outer post 320 with attachment means to form a composite post. As described above with respect to FIG. 2A, the composite post 310, 320 can be formed as an aluminum/steel composite post, which is then bonded to the composite sandwich panels 330, 340. The composite post 310, 320 and the composite sandwich panels 330, 340 can be bonded together by applying the attachment means to the inner surfaces 326, 328 of the outer post 320 and to the bottom surfaces 312, 314 of the inner logistics post 310.

Figure 4:
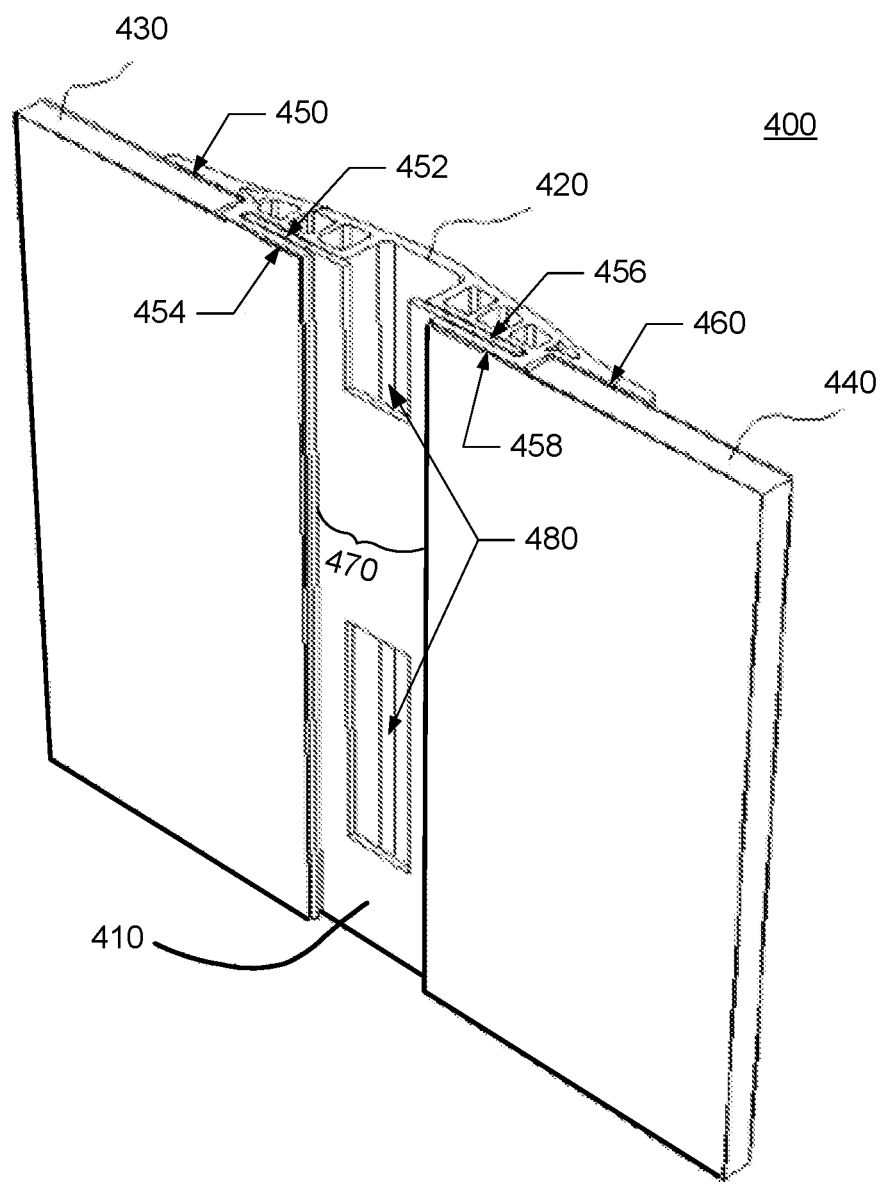
FIG. 4 is a cross-sectional top perspective view of the coupling between the composite sandwich panels and a composite post in accordance with one embodiment of the present disclosure.

FIG. 4 is a cross-sectional top perspective view of the coupling 400 between the composite sandwich panels 430, 440 and a composite post 410, 420 in accordance with one embodiment of the present disclosure. The coupling 400 is one embodiment of the coupling 150 shown in FIG. 1B. The cross section is made by slicing the coupling 150 along the line A-A' and looking down in the direction 164 of FIG. 1B.

In the illustrated embodiment of FIG. 4, the composite post includes an inner logistics post 410 and an outer post 420. The inner logistics post 410 is inserted into a pocket of the outer post 420 and bonded together with attachment means 452, 456. The composite post 410, 420 and the composite sandwich panels 430, 440 can then be bonded together by applying the attachment means to the inner surfaces 450, 460, 454, 458 of the outer post 420.

FIG. 4 also shows the portion 470 of the inner logistics post 410 that is exposed to the interior of the trailer. This portion 470 is a gap between the two adjacent composite sandwich panels 430, 440. This portion 470 also includes openings or holes 480, which can be used to connect hooks for shelves or plates across the interior of the trailer. The shelves or plates can be used to provide additional surfaces for extra cargo storage. The openings or holes 480 can also be used to connect hooks for other items such as belts or nets to secure the cargo and prevent it from moving around. Since the shelves or plates need to provide strength for storing the cargo, which may be heavy, the inner logistics post 410 is generally formed with steel or hard metallic material to provide it with strength.

Figure 5A:
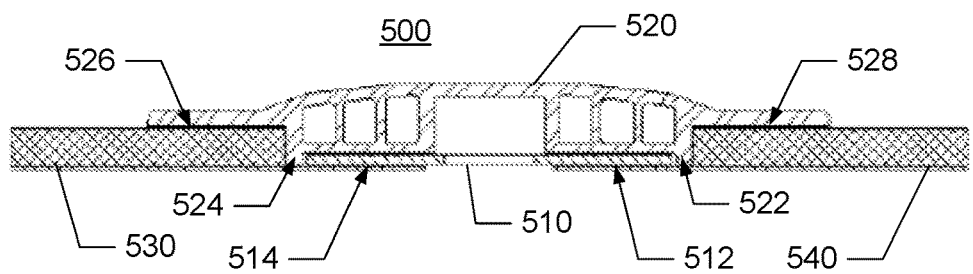
FIG. 5A is a cross-sectional top view of the coupling between the composite sandwich panels and a composite post in accordance with another embodiment of the present disclosure.

FIG. 5A is a cross-sectional top view of the coupling 500 between the composite sandwich panels 530, 540 and a composite post 510, 520 in accordance with another embodiment of the present disclosure. In the illustrated embodiment of FIG. 5A, the outer post 520 includes a protruding tab 522, 524 at each end of the bottom surface rather than a pocket. Thus, in FIG. 5A, the composite post 510, 520 couples to the composite sandwich panels 530, 540 at the inner surfaces 526, 528 and protruding tabs 522, 524 of the outer post 520 and the bottom surfaces 512, 514 of the inner logistics post 510.

Figure 5B:
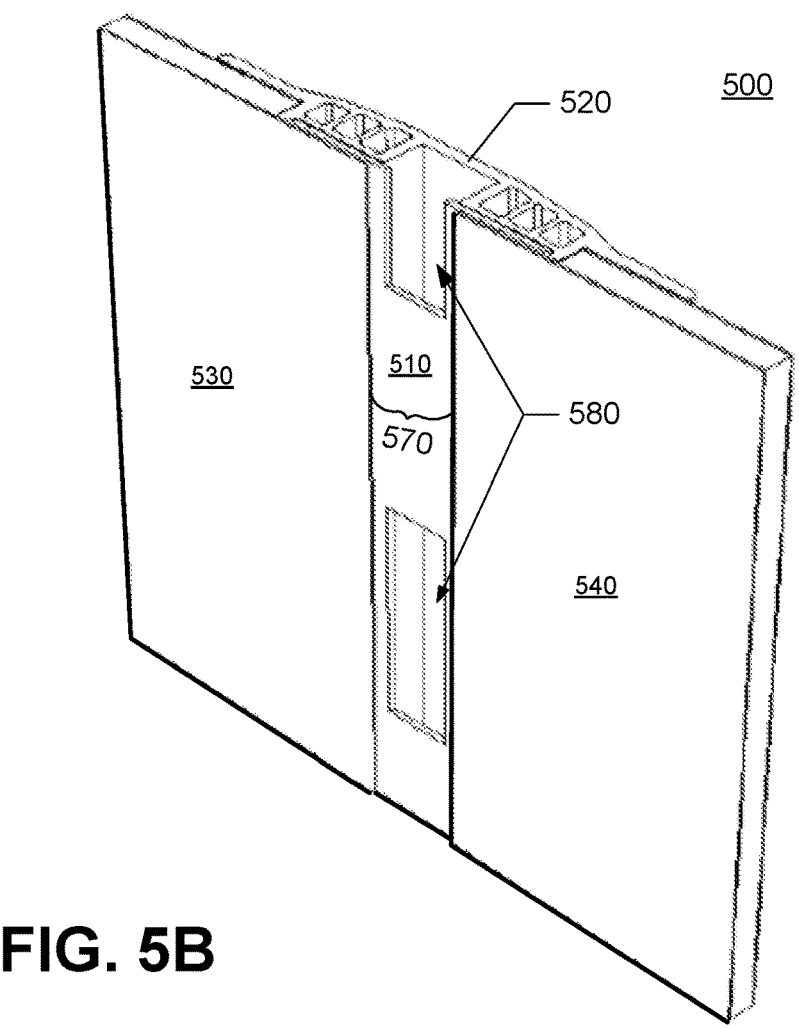
FIG. 5B is a cross-sectional top perspective view of the coupling between the composite sandwich panels and the composite post in accordance with another embodiment of the present disclosure.

FIG. 5B is a cross-sectional perspective view of the coupling 500 (shown in FIG. 5A) between the composite sandwich panels 530, 540 and the composite post 510, 520 in accordance with another embodiment of the present disclosure. Similar to the embodiment shown in FIG. 4, FIG. 5B also shows a portion 570 of the inner logistics post 510 that is exposed to the interior of the trailer. This portion 570 is a gap between the two adjacent composite sandwich panels 530, 540. This portion 570 also includes openings or holes 580, which can be used to connect hooks for shelves or plates across the interior of the trailer. The shelves or plates can be used to provide additional surfaces for extra cargo storage. The openings or holes 580 can also be used to connect hooks for other items such as belts or nets to secure the cargo and prevent it from moving around. Since the shelves or plates need to provide strength for storing the cargo, which may be heavy, the inner logistics post 510 is generally formed with steel or hard metallic material to provide it with strength.

Figure 6A:
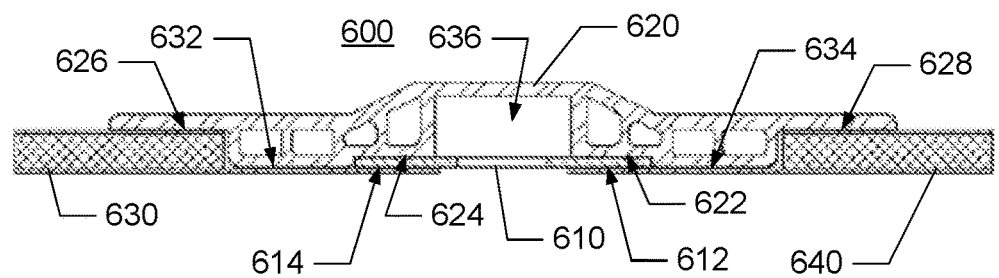
FIG. 6A is a cross-sectional top view of the coupling between the composite sandwich panels and a composite post in accordance with another embodiment of the present disclosure.

FIG. 6A is a cross-sectional top view of the coupling 600 between the composite sandwich panels 630, 640 and a composite post 610, 620 in accordance with another embodiment of the present disclosure. In the illustrated embodiment of FIG. 6A, the outer post 620 includes a depression 622, 624 formed at the middle of the bottom surface. The depression 622, 624 is an extension of the opening 636 in the middle of the outer post 620. Thus, in FIG. 6A, the composite post 610, 620 couples to the composite sandwich panels 630, 640 at the inner surfaces 626, 628, 632, 634 of the outer post 620 and the bottom surfaces 612, 614 of the inner logistics post 610.

Figure 6B:
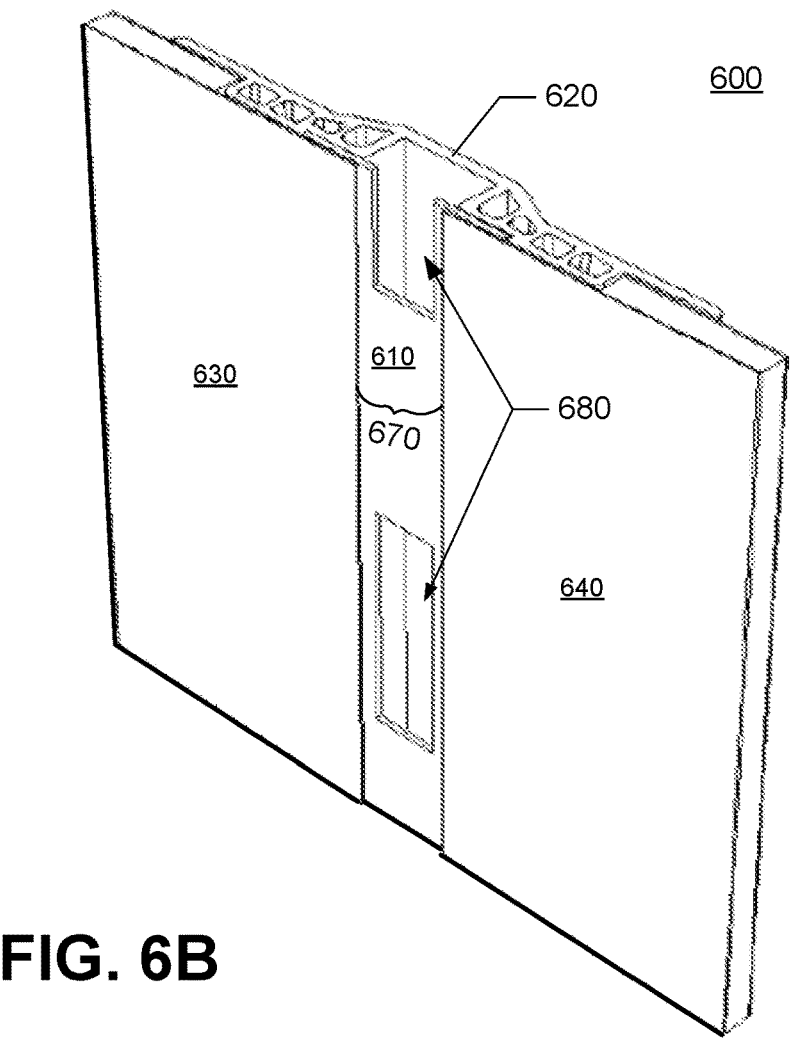
FIG. 6B is a cross-sectional top perspective view of the coupling between the composite sandwich panels and the composite post in accordance with another embodiment of the present disclosure.

FIG. 6B is a cross-sectional perspective view of the coupling 600 between the composite sandwich panels 630, 640 and the composite post 610, 620 in accordance with another embodiment of the present disclosure. Again, similar to the embodiments shown in FIGS. 4 and 5B, FIG. 6B also shows a portion 670 of the inner logistics post 610 that is exposed to the interior of the trailer. This portion 670 is a gap between the two adjacent composite sandwich panels 630, 640. This portion 670 also includes openings or holes 680, which can be used to connect hooks for shelves or plates across the interior of the trailer.

Figure 7A:
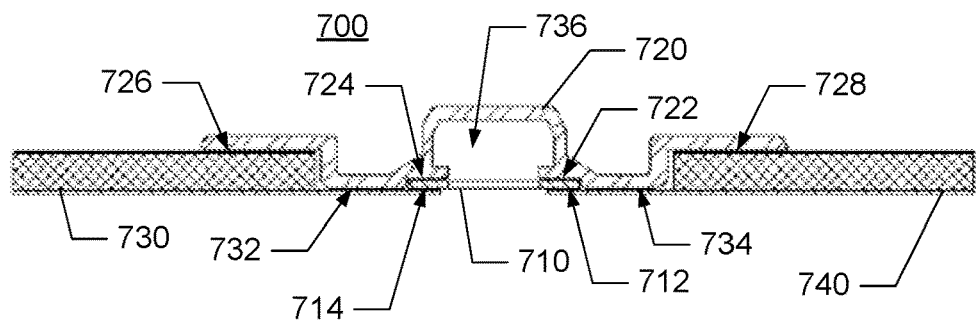
FIG. 7A is a cross-sectional top view of the coupling between the composite sandwich panels and a composite post in accordance with yet another embodiment of the present disclosure.

FIG. 7A is a cross-sectional top view of the coupling 700 between the composite sandwich panels 730, 740 and a composite post 710, 720 in accordance with yet another embodiment of the present disclosure. In the illustrated embodiment of FIG. 7A, the outer post 720 includes a depression 722, 724 formed at the middle of the bottom surface. The depression 722, 724 is an extension of the opening 736 in the middle of the outer post 720. Thus, in FIG. 7A, the composite post 710, 720 couples to the composite sandwich panels 730, 740 at the inner surfaces 726, 728, 732, 734 of the outer post 720 and the bottom surfaces 712, 714 of the inner logistics post 710.

Figure 7B:
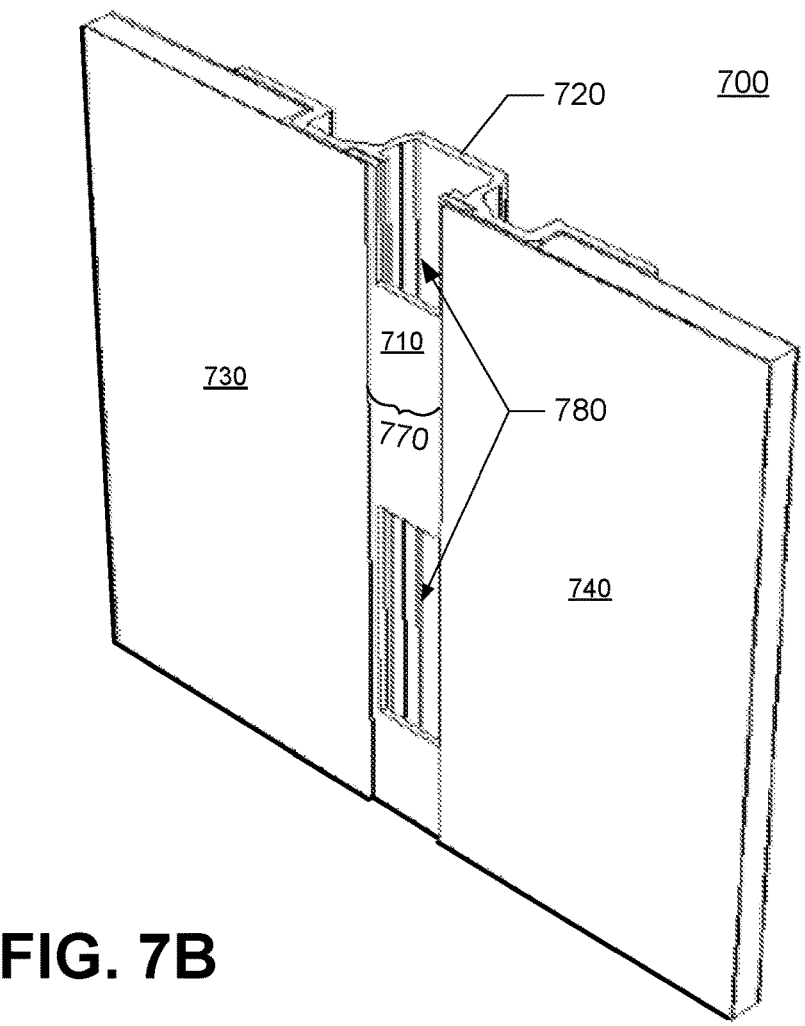
FIG. 7B is a cross-sectional top perspective view of the coupling between the composite sandwich panels and the composite post in accordance with another embodiment of the present disclosure.

FIG. 7B is a cross-sectional top perspective view of the coupling 700 between the composite sandwich panels 730, 740 and the composite post 710, 720 in accordance with another embodiment of the present disclosure. Again, similar to the embodiments shown in FIGS. 4, 5B, and 6B, FIG. 7B also shows a portion 770 of the inner logistics post 710 that is exposed to the interior of the trailer. This portion 770 is a gap between the two adjacent composite sandwich panels 730, 740. This portion 770 also includes openings or holes 780, which can be used to connect hooks for shelves or plates across the interior of the trailer.

Figure 8A:
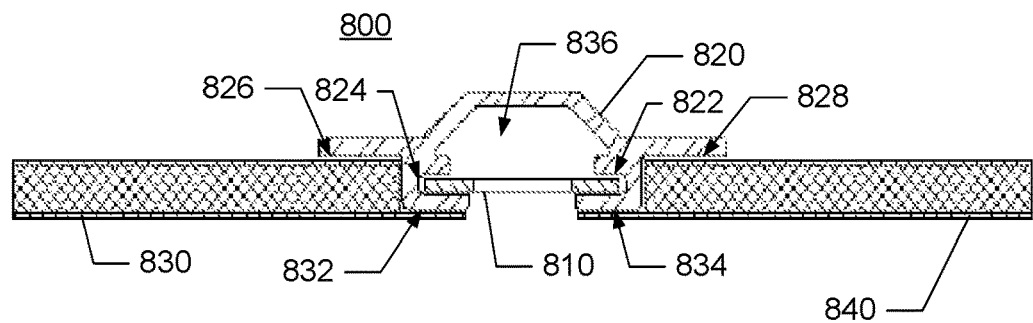
FIG. 8A is a cross-sectional top view of the coupling between the composite sandwich panels and a composite post in accordance with yet another embodiment of the present disclosure.

FIG. 8A is a cross-sectional top view of the coupling 800 between the composite sandwich panels 830, 840 and a composite post 810, 820 in accordance with yet another embodiment of the present disclosure. In the illustrated embodiment of FIG. 8A, the composite post 810, 820 includes an inner logistics post 810 and an outer post 820. The outer post 820 includes concave pockets 822, 824 formed at the ends of the bottom portion. The concave pockets 822, 824 are extensions of an opening 836 in the middle of the outer post 820. The inner logistics post 810 can be inserted into the concave pockets 822, 824 of the outer post 820. Thus, in FIG. 8A, the composite post 810, 820 couples to the composite sandwich panels 830, 840 at the inner surfaces 826, 828, 832, 834 of the outer post 820.

Figure 8B:
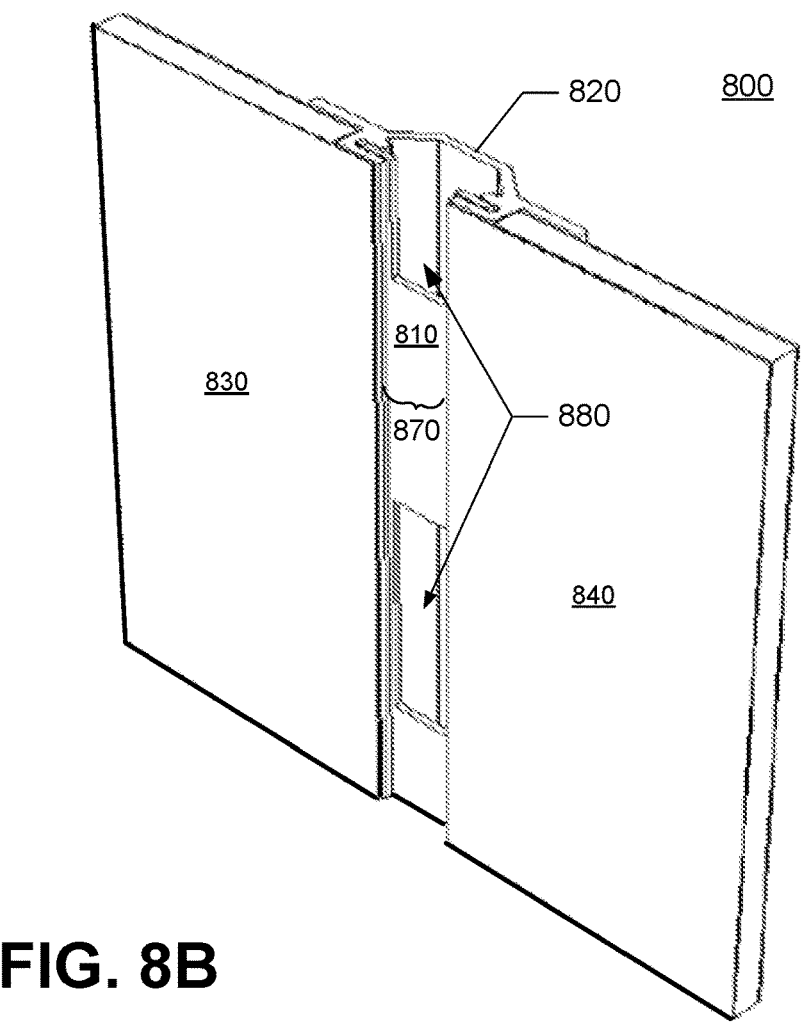
FIG. 8B is a cross-sectional top perspective view of the coupling between the composite sandwich panels and the composite post in accordance with another embodiment of the present disclosure.

FIG. 8B is a cross-sectional top perspective view of the coupling 800 between the composite sandwich panels 830, 840 and the composite post 810, 820 in accordance with another embodiment of the present disclosure. Again, similar to the embodiments shown in FIGS. 4, 5B, 6B, and 7B, FIG. 8B also shows a portion 870 of the inner logistics post 810 that is exposed to the interior of the trailer. This portion 870 is a gap between the two adjacent composite sandwich panels 830, 840. This portion 870 also includes openings or holes 880, which can be used to connect hooks for shelves or plates across the interior of the trailer.

Figure 9A:
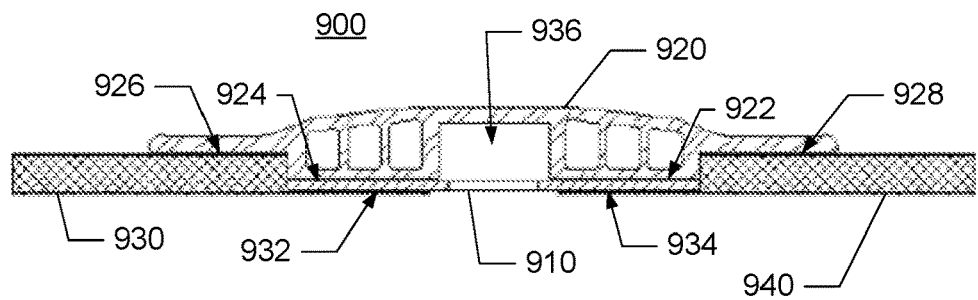
FIG. 9A is a cross-sectional top view of the coupling between the composite sandwich panels and a composite post in accordance with yet another embodiment of the present disclosure.

FIG. 9A is a cross-sectional top view of the coupling 900 between the composite sandwich panels 930, 940 and a composite post 910, 920 in accordance with yet another embodiment of the present disclosure. In the illustrated embodiment of FIG. 9A, the composite post 910, 920 includes an inner logistics post 910 and an outer post 920. The outer post 920 includes an opening 936 in the middle portion. The top surfaces of the inner logistics post 910 can be coupled to the bottom surfaces 922, 924 of the outer post 920. The inner surfaces 932, 934 of the inner logistics post 910 can be coupled to the composite sandwich panels 930, 940. Thus, in FIG. 9A, the composite post 910, 920 couples to the composite sandwich panels 830, 840 at the inner surfaces 926, 928 of the outer post 920 and the inner surfaces 932, 934 of the inner logistics post 910.

Figure 9B:
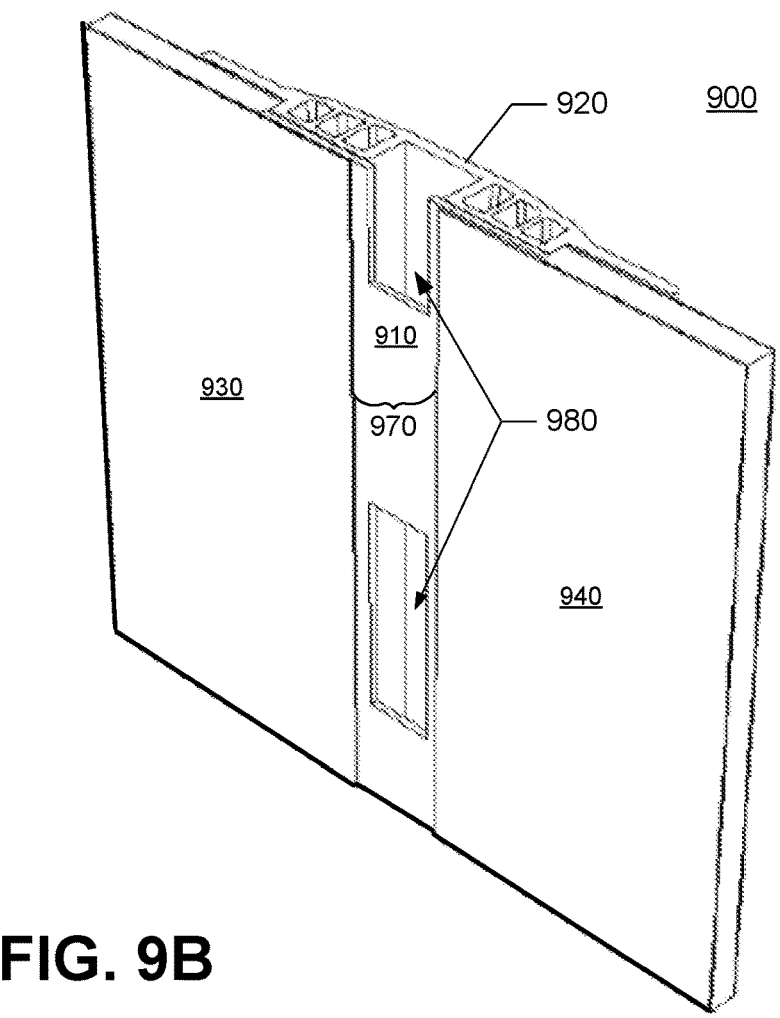
FIG. 9B is a cross-sectional top perspective view of the coupling between the composite sandwich panels and the composite post in accordance with another embodiment of the present disclosure.

FIG. 9B is a cross-sectional top perspective view of the coupling 900 between the composite sandwich panels 930, 940 and the composite post 910, 920 in accordance with another embodiment of the present disclosure. Again, similar to the embodiments shown in FIGS. 4, 5B, 6B, 7B, and 8B, FIG. 9B also shows a portion 8970 of the inner logistics post 910 that is exposed to the interior of the trailer. This portion 970 is a gap between the two adjacent composite sandwich panels 930, 940. This portion 970 also includes openings or holes 980, which can be used to connect hooks for shelves or plates across the interior of the trailer.

The descriptions of the disclosed embodiments are provided to enable any person skilled in the art to make or use the disclosure. Various modifications to these embodiments will be readily apparent to those skilled in the art, and the generic principles described herein can be applied to other embodiments without departing from the spirit or scope of the disclosure. For example, the sidewall assembly described above is equally applicable to wall assemblies of the front and/or back wall(s) of the trailer. Thus, it is to be understood that the description presented herein represent embodiments representative of the subject matter which is broadly contemplated by the present disclosure.

Additional variations and embodiments are also possible. Accordingly, the technology is not limited only to the specific examples noted herein.

The invention claimed is:
1. A sidewall assembly for a trailer, comprising:
a plurality of composite sandwich panels; and
at least one composite side post coupled to the plurality of composite sandwich panels, each of the at least one composite side post including an outer post and an inner logistics post coupled to the outer post,
wherein the outer post is formed with flexible metallic material and the inner logistics post is formed with hard metallic material,
wherein the outer post includes a pocket configured to receive the inner logistics post, the inner logistics post configured as a straight slab so that the inner logistics post stays inside the pocket without any protrusions out of the pocket,
wherein each of the plurality of composite sandwich panels includes a core and first and second outer layers coupled to the core,
wherein the first outer layer is configured to extend over the pocket of the outer post and to face the interior of the trailer.
2. The sidewall assembly of claim 1, wherein the flexible metallic material of the outer post includes aluminum.

3. The sidewall assembly of claim 1, wherein the hard metallic material of the inner logistics post includes steel.

4. The sidewall assembly of claim 1, further comprising an attachment means to attach the inner logistics post to the outer post.

5. The sidewall assembly of claim 1, further comprising an attachment means to attach the outer post of the at least one composite side post to the plurality of composite sandwich panels.

6. The sidewall assembly of claim 1, wherein the core is formed with plastic material.

7. The sidewall assembly of claim 1, wherein the pair of outer layers is formed with metallic material.

8. The sidewall assembly of claim 1, wherein the inner logistics post includes
at least one hole formed within a gap between two adjacent composite sandwich panels of the plurality of composite sandwich panels, the at least one hole configured to be exposed to an interior of the trailer.

9. The sidewall assembly of claim 8, wherein outer post includes
an opening configured to be exposed to the interior of the trailer through the at least one hole of the inner logistics post.

10. The sidewall assembly of claim 1, wherein the outer post includes
a pair of protruding tabs, each tab formed at each end of a bottom surface of the outer post,
wherein the pair of protruding tabs forms a depression at the bottom surface to receive the inner logistics post.

11. A wall assembly for a trailer, comprising:
a side post including an outer post formed with aluminum and an inner logistics post formed with steel, the side post having first and second sides;
a first composite sandwich panel coupled to the first side of the side post, the first composite sandwich panel including a first plastic core and a first pair of metallic outer layers coupled to the first plastic core; and
a second composite sandwich panel coupled to the second side of the side post, the second composite sandwich panel including a second plastic core and a second pair of metallic outer layers coupled to the second plastic core,
wherein the outer post includes a pocket configured to receive the inner logistics post, the inner logistics post configured as a straight slab so that the inner logistics post stays inside the pocket without any protrusions out of the pocket,
wherein one of the first pair of metallic outer layers and one of the second pair of metallic outer layers are configured to extend over the pocket of the outer post and to face the interior of the trailer.

12. The wall assembly of claim 11, wherein the inner logistics post includes
at least one hole formed within a gap between the first and second composite sandwich panels, the at least one hole configured to be exposed to an interior of the trailer.

13. The wall assembly of claim 12, wherein outer post includes
an opening configured to be exposed to the interior of the trailer through the at least one hole of the inner logistics post.

14. The wall assembly of claim 11, wherein the outer post includes
a pair of protruding tabs, each tab formed at each end of a bottom surface of the outer post,
wherein the pair of protruding tabs forms a depression at the bottom surface to receive the inner logistics post.

15. A sidewall assembly for a trailer, comprising:
first and second composite sandwich panels;
an outer post formed with flexible metallic material and coupled to the first and second composite sandwich panels; and
an inner logistics post formed with hard metallic material and coupled at least to the outer post,
wherein the outer post includes a pocket configured to receive the inner logistics post, the inner logistics post configured as a straight slab so that the inner logistics post stays inside the pocket without any protrusions out of the pocket,
wherein each of the first and second composite sandwich panels includes a core and first and second outer layers coupled to the core,
wherein the first outer layer is configured to extend over the pocket of the outer post and to face the interior of the trailer.

16. The sidewall assembly of claim 15, wherein the outer post includes first and second sides, wherein the first side couples to the first composite sandwich panel and the second side couples to the second composite sandwich panel.

* * * * *